United States Patent
Loubert et al.

[15] 3,694,608
[45] Sept. 26, 1972

[54] METHOD OF CONSISTENTLY REDUCING MOISTURE LOSS IN HEATING FROZEN FOODS WITH MICROWAVE ENERGY AND APPARATUS THEREFOR

[72] Inventors: Donald W. Loubert, Minneapolis, Minn. 55427; James A. Meyer, St. Louis Park, Minn. 55416

[73] Assignee: Pillsbury Company, Minneapolis, Minn.

[22] Filed: Feb. 8, 1971

[21] Appl. No.: 113,476

[52] U.S. Cl. .............................. 219/10.55, 165/12
[51] Int. Cl. ..................................... H05b 9/06
[58] Field of Search ................. 219/10.55; 165/12

[56] References Cited

UNITED STATES PATENTS 3,470,942  10/1969  Fudaka et al. ............ 219/10.55

*Primary Examiner*—J. V. Truhe
*Assistant Examiner*—Hugh D. Jaeger
*Attorney*—Ronald E. Lund, James V. Harmon and Michael D. Ellwein

[57] ABSTRACT

Food products are thawed by a series of intermittent microwave energy pulses. The duration of each pulse is maintained within a period of time during which Phase I heating takes place and before Phase II heating occurs. In the first phase of heating moisture is evolved at a relatively low rate, in a second phase of heating, moisture is evolved at a relatively rapid rate. The duration of the pulses is regulated so that heating in Phase II is avoided. The invention also concerns a microwave oven including a pulsing timer for providing a series of short pulses of microwave energy of adjustable duration from a fraction of a second to about a minute so that the food can be heated by means of intermittent pulses of energy without being removed from the oven.

7 Claims, 3 Drawing Figures

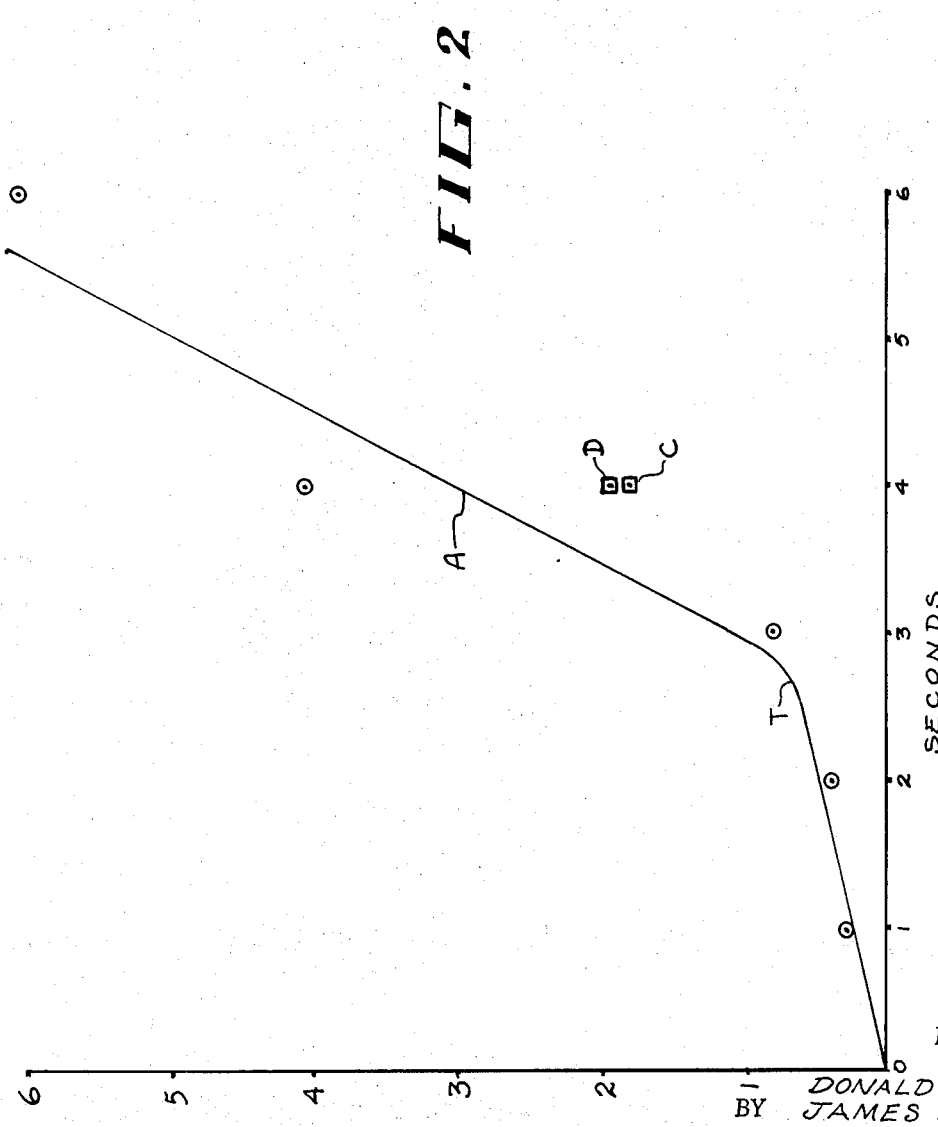

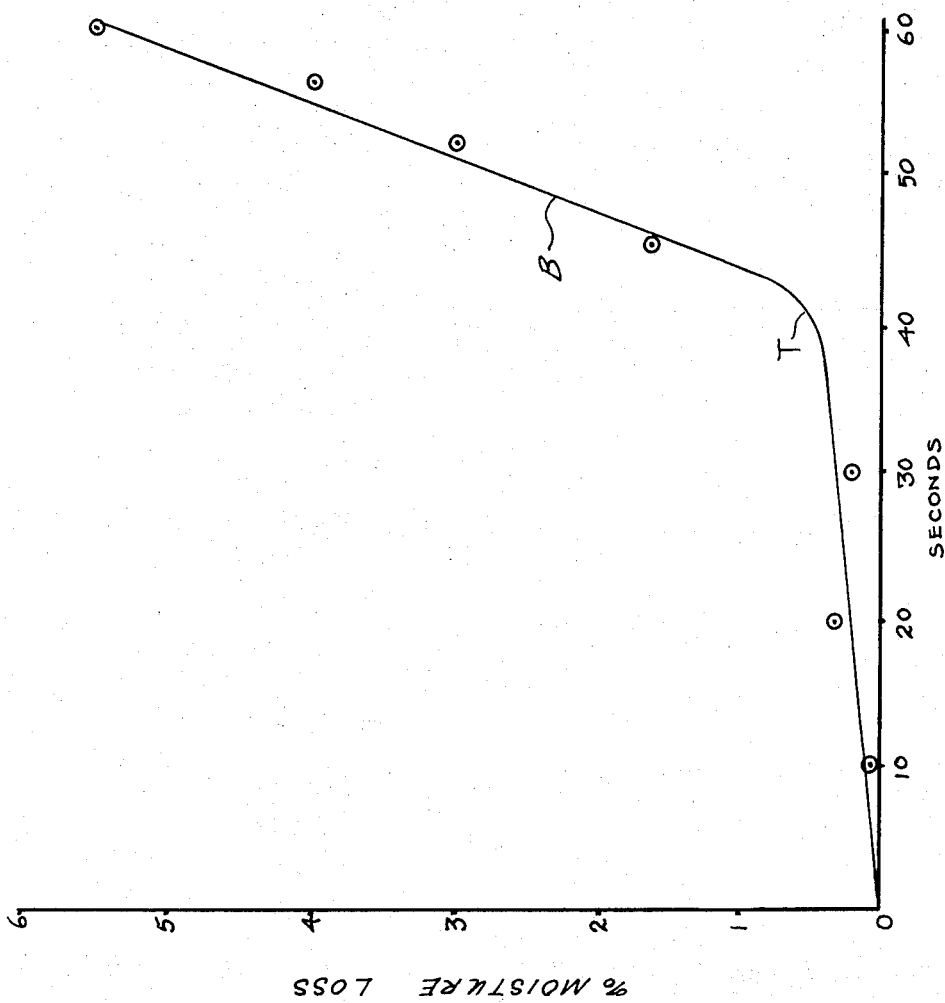

METHOD OF CONSISTENTLY REDUCING MOISTURE LOSS IN HEATING FROZEN FOODS WITH MICROWAVE ENERGY AND APPARATUS THEREFOR

FIELD OF THE INVENTION

The present invention relates to thawing of food products with microwave energy and more particularly to a method for consistently obtaining improved results in reducing moisture loss and in achieving uniform heating throughout foods of various consistencies when interrupted microwave heating is used.

BACKGROUND OF THE INVENTION

The present invention is concerned with thawing of frozen foods and usually heating them to serving temperature, e.g., from about 140° to 190° F. One particular general objective of the invention is to provide a fast system for reliably heating a complete meal composed of a variety of food which have non-uniform heating characteristics when thawed in a microwave oven and to carry out this heating operation without the requirement for handling the food between the time it is placed in the oven and is ready to eat.

Recent interest in foods that are to be taken home from the grocery store or restaurant in a ready to eat condition has produced a demand for frozen meals which can be heated quickly, e.g., about 1 to 3 minutes from a frozen condition to serving temperature. The meal must be heated from a frozen condition to serving temperature reliably without handling and without drying or burning any of the foods in the meal while at the same time uniformly heating those foods that heat slowly so that no ice is present.

The problem of thawing and heating frozen food products in a microwave oven without drying or burning them is widely known and a great many attempts have been made to overcome this problem. For example, in the volume *Microwave Heating* by David A. Copson, Avi Publishing Company, 1962, page 307, it is explained that the effect of large differences in microwave absorption (for example, between thawed and frozen regions in the same food) may be minimized by permitting heat conduction to equalize the temperature differences. In practice this amounts to what the author refers to as interruption of the microwave thawing by short resting periods (on-off thawing). This method of thawing is proposed for food masses which do not permit agitation by stirring such as roasts or certain casseroles. Interrupted microwave heating is, however, slow and requires additional handling. Thus, several years later, the booklet entitled *A Guide To Microwave Heating*, Northwood Industrial Publications, Ltd., 1967 describes the heating of frozen foods in a microwave oven for a short period of time so that the surface layers become warm followed by withdrawing the food and allowing it to stand for four or five minutes in order that heat may flow from the hotter regions to the cold center.

Interrupted microwave heating as described in these references was tried by us and was found to be slow and to produce widely varying results in moisture loss. Moreover, certain foods such as rolls or other cereal based products tended to dry out and burn whereas dense products containing higher amounts of moisture such as vegetables would frequently contain pieces of ice after a substantial period of heating even though heating was interrupted.

OBJECTS OF THE INVENTION

The present invention has among its objects the provision of an improved process and apparatus for heating frozen foods with microwave energy having the following characteristics and advantages: a) the ability to reliably thaw frozen foods and optionally heat them to serving temperature without excessively drying or burning those foods which are heated at the most rapid rate, b) the ability to heat frozen foods to serving temperature in an overall time of less than about 5 minutes without removing them from the oven and without the requirement for otherwise handling the foods between the time they are placed in the oven and the time they reach the required temperature, c) the ability to heat a variety of foods from the frozen state to room temperature or above with a reduction in the amount of moisture that is lost by at least a third of that which would be lost if the food were heated using continuous micro-wave energy of the same total on-time.

DESCRIPTION OF THE DRAWINGS

FIG. 2 is a graph illustrating the operation of the invention in connection with a dinner roll and FIG. 3 is a graph illustrating the use of the invention in heating a frozen vegetable.

SUMMARY OF THE INVENTION

Figure 1:
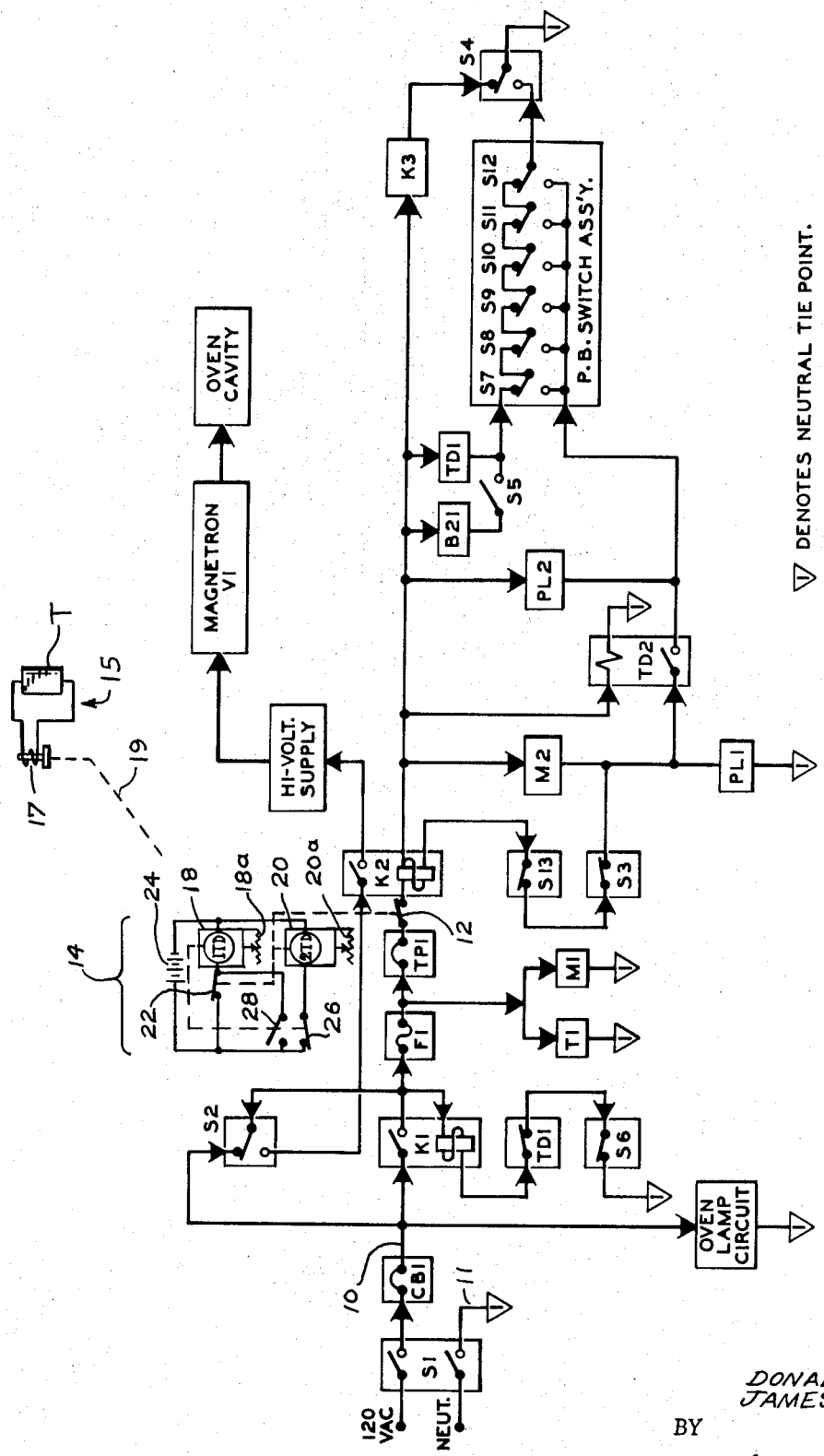
FIG. 1 is a schematic diagram of the wiring arrangement employed in one microwave oven embodying the invention.

Food products are thawed utilizing interrupted microwave energy consisting of a series of pulses each of which is preferably less than but at the longest not much longer than the primary phase of heating in which moisture is evolved at a relatively low rate and substantially avoiding the secondary phase of heating during which moisture is evolved at a relatively rapid rate. The invention also concerns an oven for utilizing the invention which consists of an oven enclosure or oven cavity having a door, a source of microwave energy and a duct for conducting the microwave energy from the source into the oven chamber together with a means for timing the source of microwave energy so that the microwave energy can be supplied to the oven in a series of pulses with a provision for varying the pulse length from a fraction of a second to several seconds and optionally for changing the duration of the on and off periods from the beginning of the cycle to the end of the cycle so that food products are heated consistently from a frozen condition to 32° F. or more with a substantial reduction in the moisture loss that would otherwise be experienced if a continuous pulse of microwave energy were employed.

DESCRIPTION OF THE PREFERRED EMBODIMENT

The present invention in part concerns a way in which intermittent pulses of microwave energy of relatively short time duration can be used to heat either single frozen food items or several frozen food products of the kind that would be found in a complete meal until they are thawed or reach serving temperature in an overall time of less than 5 minutes or so without drying or burning them or removing them from the oven.

The problem of reliably heating foods to serving temperature without excessive drying or burning is believed by us to be due in part to the transparency of the ice crystal to microwave energy and the preferential absorption of microwave energy by the minute amounts of liquid water distributed throughout the product which becomes heated rapidly and absorb most of the microwave energy. In foods such as a dinner roll which are likely to be burned there is after a short period of heating probably a higher proportion of water in the liquid state than in a denser food item which has been exposed to the same conditions of heating. Moreover, the total heat capacity of a dinner roll is low. In any event, the roll is more sensitive to the possibility of becoming dried out and burning. To complicate the problem, different foods require different amounts of power to be heated. For example, heating white bread from a frozen state requires about 8.8 watt hours per pound whereas frosted layer cake required about 13 watt hours per pound.

The success of the invention is due in part to the discovery that the evolution of moisture from food items that are heated in a microwave oven occurs in two phases. In the primary phase, moisture is lost at a relatively low rate while in the secondary phase moisture is lost at a much higher rate. The time at which the transition from Phase I to Phase II occurs varies from one food product to another and from one oven to another depending partially upon the moisture content, density of the food product, its heat capacity, and its dielectric constant as well as the power and wave length of the oven. In one application of the invention, a meal which includes a portion of meat, a vegetable, potatoes and a roll or bun are stored in a container such as a paperboard box, initially at a temperature of about 0° or +10° F. The box is placed in the oven and is heated from the frozen state to consuming temperature; usually 140° to 160° F. In the fast food service restaurant business the meal can be consumed immediately or taken home for serving.

The discovery of the primary and secondary heating rates was made by subjecting similar food products to longer and longer pulses of microwave energy. The percentage of moisture loss that takes place in each piece is then plotted against the length of the pulse. A graph of this kind is shown at A of FIG. 1 in which 5 dinner rolls were exposed to microwave energy in a commercial microwave oven for periods of 1 second, 2 seconds, 3 seconds, 4 seconds, and 6 seconds respectively. It can be seen from curve A that the transition from Phase I to Phase II heating takes place between about 2 and 3 seconds. After 6 seconds, the roll was still somewhat cool (about 40° F.).

In accordance with the present invention, the Phase II heating portion (the steep section) of curve A is avoided. Thus the first pulse must be less than about 3 seconds, preferably about 2 seconds. The roll is then allowed to equilibrate for a period of time. The equilibration time can be varied considerably but good results have been obtained with an equilibration time of about 2 to 5 seconds for the particular roll under consideration. The roll is then subjected to another burst of energy having a duration again as long as possible without extending into the Phase II heating range. Since more water is present in liquid form after the first burst, somewhat less heating time is needed in the second burst, in this case about ½ to 1 second. The food is heated in this manner by using a series of intermittent pulses none of which are of sufficient duration to extend very far into the Phase II heating rate portion of the heating curve. In this way the moisture loss can be reduced by at least one third of what would be lost with a continuous burst of energy and in many cases to less than half the amount that would be lost with a continuous burst.

Refer now to point C of FIG. 2 which designates the moisture loss experienced after 4 seconds total on-time of intermittent heating in accordance with the present invention. The pattern of pulses for point C was 1 second on, 2 seconds off repeating for a total of 4 seconds on-time. Another run was conducted with a similar roll represented by point D. In this case the pattern used was ½ second on, 3 seconds off repeating until the treatment had been undertaken for a total of 4 seconds on-time. While the roll represented by point D was still somewhat cool although completely thawed, the roll represented by point C had only one cold spot. On the other hand, after a total of 6 seconds of continuous heating, the roll designated by point E was still cold; the center being about 40° F. The effectiveness of the invention can thus be seen by comparing the amount of moisture lost using continuous heating as shown by the curve A and the amount of moisture lost when intermittent heating is employed as shown by points C and D.

Refer now to FIG. 3 which illustrates a continuous heating curve B for another food product, in this case frozen fresh corn which was divided into a number of portions each of which was heated for a longer period of time than the preceding portion and thereafter weighed to establish the moisture loss. It can be seen in the figure that only a negligible amount of moisture loss was experienced with treatment times up to about 30 seconds (Phase I) and that thereafter moisture loss increased rapidly from about 0.2 to about 5.5 percent after a total treatment time of 60 seconds and the product was luke warm (below 100° F.) after 60 seconds. By contrast, a sample prepared in accordance with the invention (10 seconds on, 9 off once; 1 second on, 9 off 7 times; 2 seconds on, 8 off, 6 times; and 3 seconds on, 7 off 6 times) resulted in only 1.7 percent moisture loss and the product was hot (140° F.) In another run, a moisture loss was only 2.7 percent with a total heating time of 52 seconds using an interrupted pattern of 1 second on, 10 seconds off repeating for a total of 52 seconds. The serving of corn reached 190°–210° F. at the end of the run.

It was also found that better results could be accomplished using a pattern of pulses in which the "on" pulse length increased after the second pulse as the food product was heated. While the reason for this is not known with certainty, it is believed to be due in large part to accumulation of more and more water in liquid state which is capable of absorbing greater and greater amounts of energy without excessive loss.

A comparison of curves A and B show that different food products react differently and that the transition point T between Phase I and Phase II occurs after different periods of time. In all cases, however, to hold moisture loss to a minimum during thawing, heating is maintained within the Phase I heating region during each pulse.

Because the total moisture loss is in large part also a function of the total time that the product is at an elevated temperature, heating can be conducted either continuously or intermittently after the ice is melted. Thus, one can determine when all of the ice is melted for a particular food. From that point on, continuous heating can be used if desired.

In summary then, to practice the present invention, the food that is to be heated is tested individually by heating successive samples for various periods of time to plot moisture loss against total heating time and thereby establish the transition point T between Phase I and II. Next, in accordance with the invention, one uses a series of spaced pulses of microwave energy during the thawing period, with the duration of each pulse being preferably somewhat less than or at least not much greater than the length of Phase I heating for the particular food being heated with a series of rest periods between them and without removing the food products from the oven. It should be noted that if a group of foods is being heated, the most sensitive to drying should be used as a gauge to establish the pulse lengths for all of the foods in the group. Finally, after all of the ice has disappeared, the product can be heated continuously or intermittently until it has reached the required temperature.

We found that the duration of the rest periods could vary considerably but are preferably about the same length of time or somewhat longer than the duration of the pulses being used. The longer the material is allowed to rest, the better will be the equilibration of temperature between the melted ice crystals and the remaining ice. Of course, the equilibration rate is relatively high at first and then proceeds more slowly as the water and ice approach the same temperature. Generally speaking, the equilibration time or rest period between each pulse is as long as can be tolerated in the particular commercial operation under consideration. For example, if the invention is to be applied in a fast-service restaurant for heating meals that are to be taken home to serving temperature, it may be decided that a total time in the oven of about 3 minutes is as much as can be tolerated. In that case, the rest period between pulses should be adjusted to allow the total heating including the on-pulses to be no more than 3 minutes. The rest periods can be somewhat longer at the end of the run than at the beginning of the run. In other words, less time is required for equilibration near the beginning of the run.

In FIG. 1 is shown a typical oven embodying the invention. While the circuit, except for the pulsing timer 14 or 15, employed to make a series of interrupted pulses is known, the placement, location and operation of the pulsing timer with relation to the other parts of the circuit is shown and described to provide a complete disclosure of a working embodiment of the invention.

A source of current such as 120 volts AC is provided on line 10 and is fed through the main on-off switch S1 which switches both the AC line and the neutral line 11. From the main on-off switch S1 the AC line 10 is connected through circuit breaker CB1 to the oven lamp circuit, and thence through hold relay K1 and to the normally closed top contact of the top door switch S2. If it is assumed that the oven door is open, S2 will be closed as shown in FIG. 1 thereby connecting line 10 to the coil of the hold relay K1. The neutral line is connected through the timer safety switch S6 and the automatic shutdown time delay TD1, both of whose contacts are normally closed to the other side of the coil of the hold relay K1. Consequently, the hold relay K1 will energize, closing its contacts which in turn will hold the AC line 10 on the coil of K1 thereby keeping it energized regardless of the operation of the top door switch S2. K1 will remain energized until either the automatic shutdown time delay TD1 or the timer safety switch S6 opens their contacts which would remove the neutral line from the coil of K1 causing it to de-energize and open its contacts. Both TD1 and S6 can open and in doing so they cause the hold relay K1 to de-energize. This in turn shuts off the entire oven except the oven lamp.

When energized, K1 also applies current from the hot line through 3 amp slow blow fuse F1 to both the filament transformer T1 and the magnetron cooling blower M1. T1 supplies filament voltage to the magnetron. From line 10, current is fed through a temperature limit switch TP1 to the coil of a cook relay K2 through the pulsing switch 12 which is operated by the pulsing timer indicated generally by the numeral 14. The pulsing timer 14 will be described in more detail below. Since the cook relay K2 is not yet connected to the neutral line, it remains de-energized. However, line 10 is connected into the timing devices which will be described in detail below. When the oven door is closed, the neutral line 11 is connected through the bottom door interlock switch S4 to the pushbutton switches S7 through S12. Closing any one of the latter will now connect the neutral line 11 through the previously closed contacts of the warmup time delay TD2 to the motor timer M2 and also through the wrapper interlock switch S3 and the left door interlock switch S13 to the coil of cook relay K2. Thus, the cook relay K2 will energize as will the timer motor M2. The ready lamp will go out at the moment the timer motor begins to run since it will at that time have the neutral line 11 connected to both sides and hence no voltage applied. The cook light P12 will light as soon as one of the push button switches is pushed regardless of whether the warmup time delay TD2 has closed or not. When the cook relay K2 energizes, its contacts close and apply current from line 10 to the top door interlock switch S2 which is closed between the arm and its bottom contact (due to the oven door being closed) to the high voltage supply which applies a rectified high voltage to the cathode of the magnetron V1. This causes the latter to begin generating energy which is coupled to the oven cavity through a section of wave guide.

Without yet considering the pulsing timer 14, the oven will continue cooking in this manner until the cook relay K2 is deenergized. This would normally be caused by either the completion of the timing cycle or the opening of the oven door. Either action would release the pushbutton switch S7 through S12. Completion of the timing cycle would mechanically release the pushbutton switch while opening the oven door would apply the neutral line from the bottom door interlock switch to the timer release solenoid K3, activating it and thereby releasing the switch. A buzzer BZ 1 sounds as the timer motor is resetting.

At the completion of the cook cycle, the neutral line 11 is connected through the top normally closed contacts of the pushbutton S7 through S12 provided the oven door remains closed to the heater of the automatic shutdown time delay TD1 which then begins to heat and after about a minute will cause its contacts illustrated beneath the hold relay to open, thereby de-energizing the hold relay K1. As previously discussed, this action shuts the entire oven off except for the oven lamp. The oven is then in a stand-by condition and will remain so until the oven door is again opened. The oven and the controls including the circuit described hereinabove with the exception of the pulsing timer to be described hereinbelow can be obtained commercially from any suitable source of supply such as The Magic Chef Corporation of Cleveland, Tennessee. The pulsing timer 14 will now be described. As mentioned above, the pulsing timer 14 includes a pulsing switch 12 in line 10 next to the cook relay K2. Switch 12 is operated by a pair of solid state timers 18 and 20 which are provided with relays 1TD and 2TD respectively. The armature of relay of timer 2TD is connected to switch 12 which is normally closed and to normally closed switch 22 which in turn is wired between 1TD and the power supply 24 for the pulsing timer 14. The armature of 1TD is connected to a normally closed switch 26 wired between 2TD and the power supply 24 and a normally open switch 28 which is connected across switch 22. The time constants for the timers 18 and 20 are controlled with potentiameters 18a and 20a respectively. As 1TD and 2TD are alternately energized, their respective contacts change from the conditions shown in FIG. 1 to the opposite condition and remain in that condition until one of the timers 18 or 20 as the case may be operates its relay 1TD or 2TD, whereupon the switch is again returned to the condition illustrated. In this way power through line 10 to K2 is interrupted to provide a series of pulses in accordance with the invention. The timer 14 should be capable of providing on-times for from about a half a second duration to about a minute or so. An alternative form of pulsing timer is shown at 15. The timer 15 consists of a barrel timer T which includes a number of movable switch actuating projections that allow the on and off time of each pulse and rest period to be selected and changed as desired so that, for example, the on pulses might become longer as the rest periods become shorter. The timer T is wired to a relay 17 having an armature connected by linkage 19 to the switch 12 in place of the timer 14.

While one particular oven control and pulsing timer has been described in detail it will be apparent to those skilled in the art that other ovens and controls as well as other pulsing timers can be used provided the pulsing timer is capable of producing a series of relatively short pulses of selected duration to the oven cavity separated by rest periods of a predetermined duration while the oven door remains closed and the food remains in the oven.

What is claimed is:

1. A method of thawing frozen foods utilizing a microwave oven including an oven cabinet, a source of microwave energy communicatively connected to be fed into the oven and a timing means operatively associated with the oven for turning on and off microwave energy supplied to the oven while the food products remain in the oven, said method comprising, heating the food product with a series of pulses interrupted by rest periods with the duration of each pulse being about the same or less than the time to reach the transition point between the primary moisture loss rate and a higher secondary loss rate, whereby the food product can be thawed without being removed from the oven, with the moisture loss reliably maintained at a level at least one-third less than that which would be lost with continuous microwave heating being used to bring the food to the same final temperature.

2. The method of claim 1 wherein the length of the pulses near the end of the heating cycle is longer than those at the beginning.

3. The method of claim 1 wherein rest periods between pulses are on the order of the same length as the pulses themselves.

4. The method of claim 1 wherein after the food product is thawed to the point where all ice crystals have disappeared, continued heating is conducted using continuous microwave energy.

5. The process of claim 1 wherein the rest period at the beginning of the heating cycle is shorter than the rest periods employed near the end of the heating cycle.

6. A method for thawing and optionally heating to serving temperature a group of foods which have different heating characteristics when exposed to microwave energy utilizing a microwave oven including an oven cabinet, a source of microwave energy communicatively connected to be fed into the cabinet and a timing means operatively associated with the oven for turning on and off microwave energy supplied to the oven while the food products remain in the oven, said method comprising: placing the food products in the cabinet, heating the food products with a series of pulses of microwave energy interrupted by rest periods while the foods remain in the oven, the duration of each pulse being about the same or less than the interval from the beginning of the pulse to the time to reach the transition point between a primary moisture loss rate and a higher secondary moisture loss rate for the food of said group which is the most sensitive to the loss of moisture, whereby the food products can be thawed without being removed from the oven and the moisture loss can be reliably maintained at a level at least one-third less that which would be lost with continuous microwave heating being used to heat the food to the same final temperature.

7. A method of thawing frozen foods in accordance with claim 1 wherein the time to reach the transition point between the primary moisture loss rate and the higher secondary moisture loss rate is determined by heating said food product with a continuous burst of microwave energy within said oven for various periods of time thereby establishing said transition point as the period of time at the end of which moisture begins to evolve at a more rapid rate.

* * * * *